(12) United States Patent
Huang

(10) Patent No.: US 10,984,067 B2
(45) Date of Patent: Apr. 20, 2021

(54) VIDEO GENERATING METHOD, APPARATUS, SERVER, AND STORAGE MEDIUM

(71) Applicant: Wangsu Science & Technology Co., Ltd., Shanghai (CN)

(72) Inventor: Xuehui Huang, Shanghai (CN)

(73) Assignee: Wangsu Science & Technology Co., Ltd., Shanghai (CN)

(*) Notice: Subject to any disclaimer, the term of this patent is extended or adjusted under 35 U.S.C. 154(b) by 0 days.

(21) Appl. No.: 16/752,450

(22) Filed: Jan. 24, 2020

(65) Prior Publication Data

US 2020/0410034 A1 Dec. 31, 2020

Related U.S. Application Data

(63) Continuation of application No. PCT/CN2019/102058, filed on Aug. 22, 2019.

(30) Foreign Application Priority Data

Jun. 26, 2019 (CN) .......................... 201910559629.2

(51) Int. Cl.
*G06F 16/957* (2019.01)
*H04N 21/235* (2011.01)
*G06F 16/958* (2019.01)

(52) U.S. Cl.
CPC ........ *G06F 16/9577* (2019.01); *G06F 16/958* (2019.01); *H04N 21/2356* (2013.01); *H04N 21/2358* (2013.01)

(58) Field of Classification Search
CPC .... G06F 16/9577; G06F 16/958; G06F 16/95; G06F 16/972; H04N 21/2356; H04N 21/2358; H04N 21/236; H04N 21/23
See application file for complete search history.

(56) References Cited

U.S. PATENT DOCUMENTS

2013/0073946 A1 3/2013 Kang et al.
2014/0359656 A1* 12/2014 Banica ................. H04N 21/234
725/32

(Continued)

FOREIGN PATENT DOCUMENTS

CN 103678487 A 3/2014
CN 104219559 A 12/2014

(Continued)

OTHER PUBLICATIONS

Mei-Chen Yeh, Selecting Interesting Image Regions to Automatically Create Cinemagraphs, Jan. 1, 2016, IEEE Computer Society, pp. 72-81 (Year: 2016).*

(Continued)

*Primary Examiner* — Tam T Tran
(74) *Attorney, Agent, or Firm* — Morgan, Lewis & Bockius LLP

(57) ABSTRACT

Embodiments of the present disclosure relate to the field of video processing field, and provide a method, an apparatus, a server, and a storage medium for generating videos. In some embodiments, webpage snapshot data is obtained in real time based on a preset web address; target webpage content is selected from the obtained webpage snapshot data; and the selected target webpage content is synthesized with a pre-obtained input video, to generate an output video including the target webpage content.

17 Claims, 9 Drawing Sheets

(56) References Cited

U.S. PATENT DOCUMENTS

| | | | |
|---|---|---|---|
| 2017/0105053 A1 | 4/2017 | Todd | |
| 2018/0077469 A1* | 3/2018 | Geduldig | .......... H04N 21/8586 |
| 2019/0138194 A1 | 5/2019 | Ryan | |

FOREIGN PATENT DOCUMENTS

| | | |
|---|---|---|
| CN | 108829540 A | 11/2018 |
| CN | 108880921 A | 11/2018 |
| CN | 109327727 A | 12/2019 |

OTHER PUBLICATIONS

Guofeng Zhang et a., Refilming with Depth-Inferred Videos, Sep. 1, 2009, IEEE Computer Society, vol. 15, No. 5, pp. 828-840 (Year: 2009).*

Xuehui. International Search Report, PCT/CN2019/102058, dated Mar. 26, 2020, 4 pgs.

Wangsu Science & Technology Co., Ltd., Extended European Search Report, EP 19832265.3, dated Jun. 4, 2020, 8 pgs.

* cited by examiner

US 10,984,067 B2

VIDEO GENERATING METHOD, APPARATUS, SERVER, AND STORAGE MEDIUM

CROSS-REFERENCE TO RELATED APPLICATIONS

The present application is a continuation of PCT Application No. PCT/CN2019/102058, filed Aug. 22, 2019, entitled "Video Generating Method, Apparatus, Server, and Storage Medium," which claims priority to Chinese Patent Application No. 201910559629.2, filed Jun. 26, 2019, entitled "Video Generating Method, Apparatus, Server, and Storage Medium," each of which is incorporated herein by reference in its entirety.

TECHNICAL FIELD

Embodiments of the present disclosure relate to the field of video processing, and in particular, to a video generating method, apparatus, server, and storage medium.

BACKGROUND

Currently, more and more people get information in the form of videos from the Internet. A videos is usually collected through a picture generating process using a camera or screen recording, and then a collected video is output via a network for users to obtain or watch. In order to improve video watching experience of the users, some additional elements such as watermarks or texts may be added to a collected video picture, and then the video is transmitted after being coded by hardware or software.

The inventor discovers at least the following problems in related technologies: a picture effect of the collected video picture can be improved by adding some additional elements to the video, and the picture effect is usually preset. Because a special effect can be relatively simple while picture layout settings are limited, it is not conducive to the configuration, adjustment, and upgrading of video picture elements, layouts, effects, and the like. It is also not possible to flexibly control the picture effect in real time.

SUMMARY

Embodiments of the present disclosure are intended to provide a video generating method, apparatus, server, and storage medium, so that more abundant video content can be generated, and expressiveness of a video is improved.

In order to solve the foregoing technical problem, embodiments of the present disclosure provide a video generating method applicable with a server, including: obtaining a web address and obtaining webpage snapshot data based on the web address; selecting a target webpage content from obtained webpage snapshot data; and synthesizing a selected target webpage content with a pre-obtained input video, to generate an output video including the target webpage content.

Embodiments of the present disclosure further provide a video generating device, including: an obtaining module, a selection module, and a synthesis module. The obtaining module is configured to obtain webpage snapshot data based on an obtained web address; the selection module is configured to select target webpage content from the obtained webpage snapshot data; and the synthesis module is configured to synthesize the selected target webpage content with a pre-obtained input video, to generate an output video including the target webpage content.

Embodiments of the present disclosure further provide a server, including: at least one processor; and a memory in communication with the at least one processor for storing instructions executable by the at least one processor, and the instructions are executed by the at least one processor to enable the at least one processor to perform the foregoing video generating method.

Embodiments of the present disclosure further provides a storage medium storing a computer program, and when the computer program is executed by a processor, the foregoing video generating method is implemented.

Compared to the existing technology, in the embodiments of the present disclosure, webpage snapshot data is obtained in real time based on a web address, target webpage content to be synthesized with a video is selected from the obtained webpage snapshot data, and the target webpage content is synthesized with an input video. Because the webpage content is characterized by a flexible element layout, abundant content, ease of configuration and modification, strong expressiveness, and the like, webpage texts, picture content, page elements, animation effects, and the like are synthesized into a video picture, and are used as a special effect in the video picture and a scenario layout effect of the video picture, so that the generated video picture is more flexible and vivid, and it is also easy to configure and upgrade elements, a layout, an effect, and the like of the video picture.

In some embodiments, synthesizing the selected target webpage content with a pre-obtained input video specifically includes: adjusting a transparency of each pixel in the target webpage content and a transparency of each pixel in a pre-selected input video frame to be synthesized, where the input video frame to be synthesized is selected from the input video; superimposing the target webpage content and the input video frame to be synthesized after adjusting the transparency. In this way, the webpage content and the input video to be synthesized are combined by fusing all pixels, so as to add the webpage content to the input video.

In some embodiments, a superimposing manner is specifically: full-picture superimposing or superimposing in a specified region. In this way, different synthesis manners may be selected based on a location of the webpage content that needs to be synthesized.

In some embodiments, after obtaining webpage snapshot data, and before selecting target webpage content, the method further includes: selecting a target cache mode from a plurality of preset cache modes; and caching the obtained webpage snapshot data based on the selected target cache mode; and selecting target webpage content from the obtained webpage snapshot data specifically includes: selecting the target webpage content from cached webpage snapshot data. In this way, a proper caching manner may be selected based on the obtained webpage snapshot data for caching, to adapt to different types of webpage snapshot data.

In some embodiments, selecting target webpage content from cached webpage snapshot data specifically includes: decoding the cached webpage snapshot data to obtain a webpage frame; and selecting the target webpage content from the webpage frame. The cached webpage snapshot data is converted into the webpage frame at a time, so that a quantity of decoding times is reduced. The webpage snapshot data is converted into the webpage frame through decoding, and the target webpage content is selected from a plurality of webpage frames, so that it is easier to obtain the target webpage content.

In some embodiments, selecting target webpage content from cached webpage snapshot data specifically includes: determining a timestamp of the target webpage content based on a timestamp of the input video frame to be synthesized, the input video frame to be synthesized is selected from the input video; selecting webpage data to be synthesized from the cached webpage snapshot data based on the determined timestamp of the target webpage content; and decoding selected webpage data to be synthesized to obtain the target webpage content. The webpage data to be synthesized is selected from a plurality of pieces of cached webpage snapshot data through the timestamp, and the webpage data to be synthesized is decoded. A small amount of webpage data to be synthesized is decoded each time, and decoded webpage data to be synthesized is released after being used, so that memory occupied by the decoded data is reduced.

In some embodiments, after obtaining a webpage frame to be synthesized, and before selecting target webpage content from the webpage frame to be synthesized, the method further includes: adjusting a pixel format of the webpage frame to be synthesized and a pixel format of the input video to be the same. In this way, the obtained target webpage content and the input video frame have the same pixel format, so that a video image is synthesized at a pixel level, and a synthesized output video has a better picture effect.

In some embodiments, after selecting target webpage content, and before synthesizing the selected target webpage content with a pre-obtained input video, the method further includes: adjusting a resolution of the target webpage content and a resolution of the input video to be the same. A resolution is a quantity of pixels in a unit area of a picture. The resolution of the target webpage content and the resolution of the input video frame are adjusted to the same resolution, and pixels may correspond to each other in a process of synthesizing the target webpage content with the input video, so that it is easier to synthesize the target webpage content and the input video.

In some embodiments, obtaining webpage snapshot data based on the web address specifically includes: rendering a webpage picture based on the web address, and capturing a rendered webpage picture in real time; obtaining a captured webpage picture as the webpage snapshot data; and stopping rendering the webpage picture, and stopping capturing the rendered webpage picture when an amount of obtained webpage snapshot data reaches a preset threshold. In this way, resource consumption can be reduced.

In some embodiments, capturing a rendered webpage picture in real time specifically includes: capturing the loaded webpage picture in real time after the webpage picture is loaded, to ensure that the captured webpage snapshot data is valid data.

In some embodiments, the webpage snapshot data obtained in real time is specifically: webpage snapshot data that satisfies a preset page attribute; where the page attribute includes at least any one of or any combination of the following: a background color, a resolution, or an interaction mode. An attribute of the obtained webpage snapshot data is adjusted based on the preset page attribute, so as to more easily synthesize the target webpage content obtained through the webpage snapshot data with the input video.

In some embodiments, the preset web address is specifically a template address; where the template address corresponds to a webpage template picture; the webpage template picture is generated based on a layout manner and a picture effect of a historical output video; and the webpage snapshot data is specifically screenshot data of the webpage template picture. Picture layout elements and effects in the output video except the collected input picture are extracted as a webpage template, a corresponding template address is obtained while storing the webpage template onto the Internet, a pre-stored webpage picture of the webpage template may be obtained based on the template address, and the webpage snapshot data including the layout manner and the picture effect of the historical output video is obtained, so that the layout manner and the picture effect of the historical output video may be combined with the current input video to be synthesized, and a same special effect may be directly added to videos of a same type, thereby simplifying a process of synthesizing the webpage content with the input video, and improving synthesis efficiency.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To make objectives, technical solutions, and advantages of the embodiments of the present disclosure clearer, the following describes the embodiments of the present disclosure in detail with reference to the accompanying drawings. Those of ordinary skill in the art may appreciate that many technical details are provided in the embodiments of the present disclosure to help a reader better understand the present disclosure. However, the technical solutions claimed in the present disclosure can be implemented without these technical details and various changes and modifications based on the following embodiments.

The following embodiments are divided for the ease of description, and should not be construed as limiting the detailed description of the present disclosure. The embodiments may be combined with each other and reference may be made to each other as long as no contradiction occurs.

Figure 1:
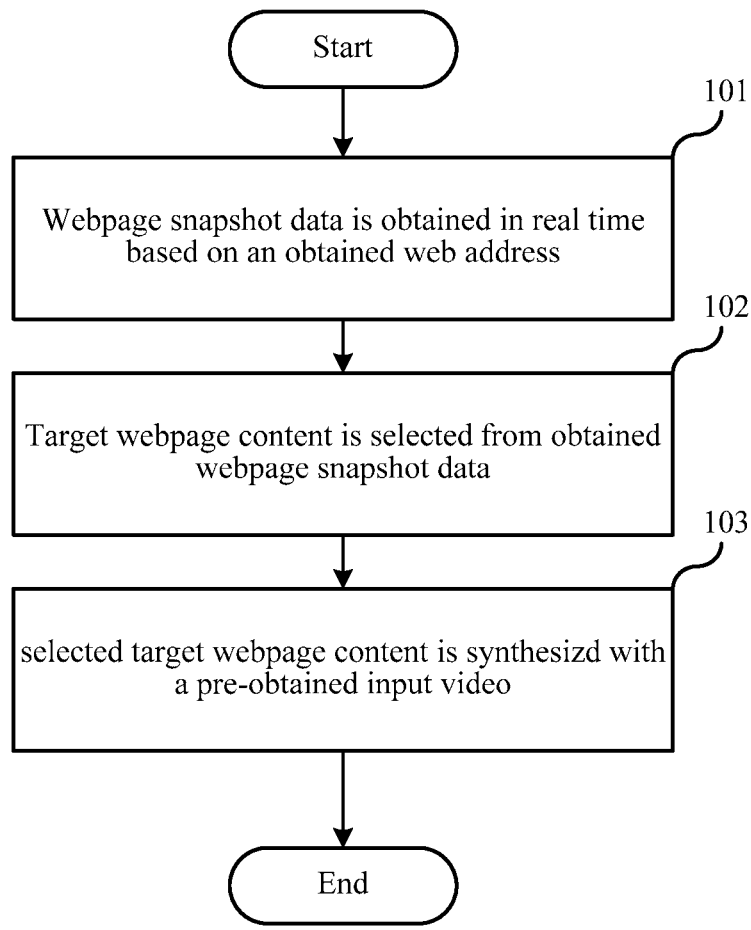
FIG. 1 is a flowchart of a video generating method according to a first embodiment of the present disclosure.

A first embodiment of the present disclosure relates to a video generating method, including: obtaining webpage snapshot data in real time based on a preset web address; selecting target webpage content from obtained webpage snapshot data; and synthesizing a selected target webpage content with a pre-obtained input video, to generate an output video including the target webpage content. A server synthesizes an input video obtained by a camera shooting, a screen capture or a decoded source video with a picture including webpage content and elements, to generate a final output video picture, so that the generated output video picture has more abundant content, and the output video picture has a more vivid effect. Implementation details of the video generating method in the present embodiment are described in detail below. The following content is merely to facilitate understanding of the provided implementation details, and is not mandatory to implementation of the present solution. A specific process is shown in FIG. 1.

Step 101: Webpage snapshot data is obtained in real time based on an obtained web address. In particular, a server obtains a web address when the server needs to combine webpage content with an input video. An obtained web address may be a web address of the Internet such as Baidu and Youku, or may be another web address such as a template web address. A webpage frame rendered based on the template web address includes fixed special effects, pictures, or texts, and these special effects, pictures, and texts are frequently used in a combination process, and may be directly obtained through the template web address. Therefore, time required by typesetting in the combination process is reduced. The web address may be changed based on different content that needs to be synthesized by different input video frames to be synthesized. With the development of technologies such as HTML5 and JavaScript and the emergence of various browser front-end technologies, the webpage content is presented in an increasingly better effect, and the webpage content is increasingly abundant. When obtaining the webpage content to enrich a video picture, the server may query, based on the web address, a webpage on which a required webpage content is located, and capture the webpage corresponding to the web address as the webpage snapshot data and store the webpage snapshot data, so as to select the required webpage content subsequently from the webpage snapshot data.

When the webpage snapshot data is being obtained, a browser may be controlled to access a preset web address, and the browser may be controlled to render a webpage picture and obtain the webpage snapshot data. When the browser is controlled to access the preset web address, a controlled browser need to support a development tool debugging protocol, such as the devtools protocol of Google Chrome, and the server may control operations of the browser through the development tool debugging protocol, and obtain related information such as a page and a network of the browser.

Figure 2:
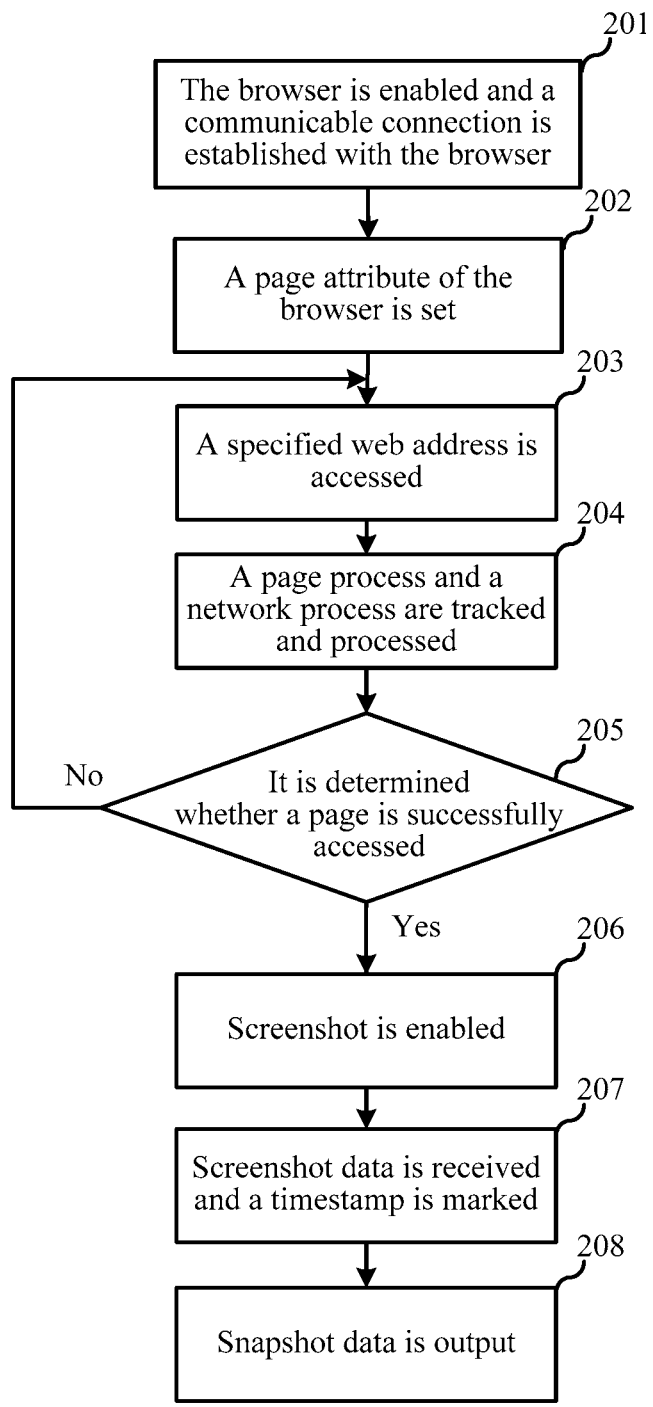
FIG. 2 is a flowchart of obtaining webpage snapshot data according to a first embodiment of the present disclosure.

A process of controlling the browser to render the webpage picture and obtain the webpage snapshot data is described below, and is shown in FIG. 2.

Step 201: the browser is enabled and a communicable connection is established with the browser. In particular, debugging related parameters such as a debugging port and security options are set as required, a browser process is started, and the communicable connection is established to the browser based on a communication protocol of the development tool debugging protocol, so as to send a control instruction to the browser, to control the operations of the browser and obtain information related to the operations of the browser.

Step 202: a page attribute of the browser is set. In particular, in order to synthesize the webpage content with an output video, a related attribute of a browser page needs to be set. A set page attribute mainly includes a resolution, background color information, interaction setting, and the like, to ensure that the webpage snapshot data satisfies the preset page attribute. In a specific implementation process, a resolution of the browser page is usually set to be the same as a resolution of an output video picture, and a background color may be set to a transparent color. In this way, a webpage background part of the obtained webpage snapshot data except webpage elements such as texts, animations, and an input box is transparent, thereby helping synthesize the obtained webpage content with the input video, and reducing processing on an obtained webpage screenshot before synthesis. In addition, operations related to man-machine interaction on the webpage may affect quality of obtaining the webpage snapshot data. Therefore, in a specific implementation process, an operation related to man-machine interaction may be prohibited, such as prohibiting the webpage from popping out a dialog box or displaying no scroll bar on the webpage.

Step 203: a specified web address is accessed. In particular, after a related attribute of the webpage is set, an operation of accessing a preset web address to obtain the webpage snapshot data may be performed. The server sends, to the browser based on the preset web address, a control instruction of accessing the specified web address, and after receiving the control instruction, the browser accesses the specified web address.

Step 204: a page process and a network process are tracked and processed. In particular, while the browser is accessing the specified web address, an instruction of tracking the page process and the network process is sent to the browser by using the development tool debugging protocol, and information related to processing of the corresponding page process and network process is received. The page process includes processes and related events such as creation of a page, starting to load the page, and loading completion. The network process includes processes and related events such as initiation of a network request, failure of the network request, success of the network request, and data receiving. Whether the specified webpage is successfully accessed may be known by tracking the page process and the network process.

Step 205: it is determined whether a page is successfully accessed, and if a determining result is yes, step 206 is performed, or if the determining result is no, step 203 is returned to. In particular, if access fails, retry may be performed for a specific quantity of times. If access still fails after a plurality of times of retry, error information is fed back to the outside, and the present process is stopped. If access succeeds, a page screenshot operation may be performed after the page is loaded, screenshot data is obtained, and the screenshot data is stored as the webpage snapshot data, to ensure that the captured webpage snapshot data is valid data.

Step 206: screenshot is enabled. In particular, after it is tracked that the page is successfully accessed and the page is loaded, a screenshot instruction may be sent to the browser, to obtain a screenshot that is of a webpage at a current moment and that is returned by the browser, and use the screenshot as snapshot data of the current webpage. Because picture content of the webpage may be constantly changing, and may also remain unchanged within a specific period of time, for different page content, different screenshot manners need to be used, so that resource consumption can be reduced while the webpage snapshot data is obtained.

When picture content of the webpage is constantly changing, for example, the webpage may include an animation or include scrolling texts, the screenshot instruction may be sent to the browser at fixed times, to obtain latest picture content. An interval of the fixed times may be set based on a frame rate of a video picture to be synthesized. For example, when the frame rate of the video picture to be synthesized is 25 frames per second, a duration of one frame is 1/25=0.04 seconds, that is, 40 milliseconds. It means that there is one frame of input video frame every 40 milliseconds. Because the webpage content needs to be synthesized into the input video, and there is one input video frame every 40 milliseconds, one webpage frame is required every 40 milliseconds. Therefore, a time interval may be set to 40 milliseconds, so that each frame of the video to be synthesized can correspond to one webpage content screenshot. If the webpage picture content remains unchanged in a specific period of time, the webpage snapshot data may be obtained only once in the period of time, and the browser may be requested by using the development tool debugging protocol, to set the browser to actively return new picture screenshot data only when the webpage content changes. In this way, there is no need to set a time interval to send the screenshot instruction to the browser at fixed times, and the browser only needs to be requested once, so that the browser returns a screenshot of latest changed webpage content when the webpage content changes, thereby avoiding capturing repeated webpage content.

Step 207: screenshot data is received and a timestamp is marked. In particular, after the screenshot instruction is sent to the browser, the browser returns the screenshot data of the webpage in a following process. Because the webpage is usually dynamic, latest webpage screenshot data is constantly generated. In order to distinguish screenshot data generated at different moments, the timestamp of the screenshot data needs to be marked. If when the browser returns the webpage screenshot data and meanwhile a timestamp of a picture moment at which the browser renders the screenshot data, a received timestamp sent by the browser is set to the timestamp of the screenshot data. If the browser returns the screenshot data of the webpage without a corresponding timestamp, a system timestamp of a moment at which the browser returns the screenshot data of the webpage may be used as the timestamp of the screenshot data, and the screenshot data of the webpage for which the timestamp is marked is stored as the webpage snapshot data existing at the current moment.

Step 208: snapshot data is output.

Figure 3:
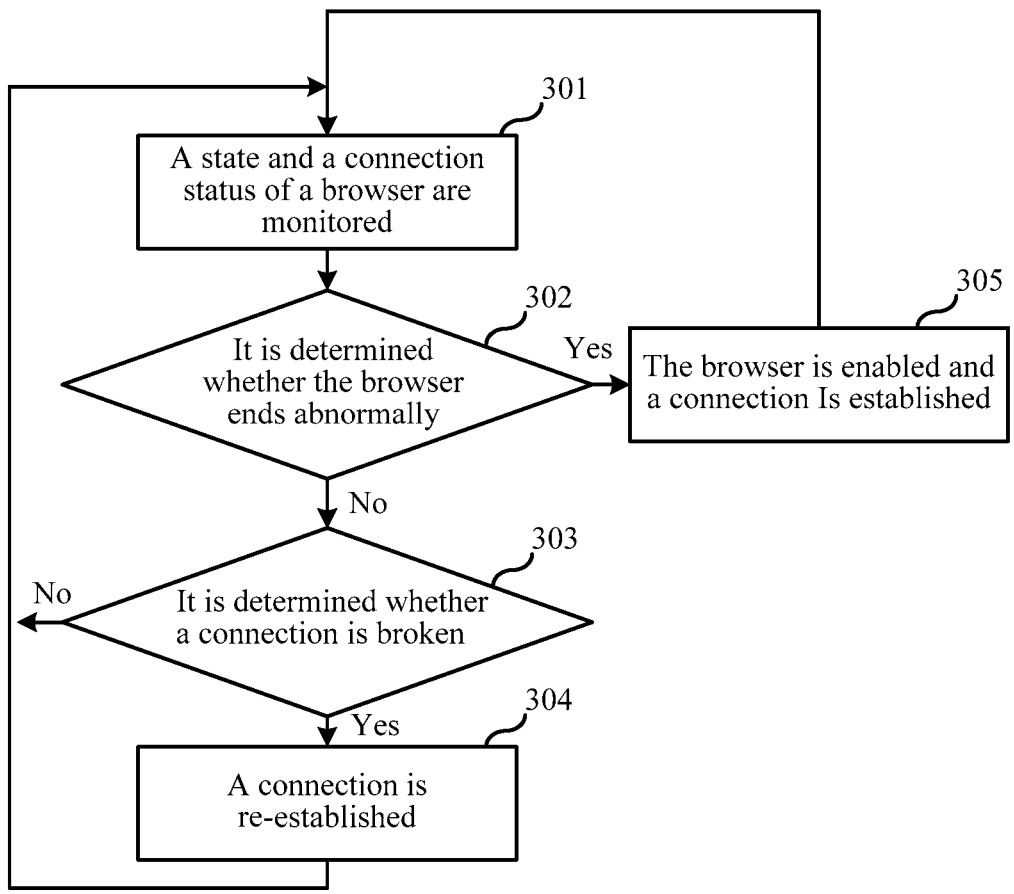
FIG. 3 is a flowchart of monitoring a state of a browser and a connection status of the browser according to a first embodiment of the present disclosure.

In addition, after the browser is enabled, a state of the browser and a connection status of the browser are monitored. Details are shown in FIG. 3.

Step 301: a state and a connection status of a browser are monitored.

Step 302: it is determined whether the browser ends abnormally, and if a determining result is yes, step 305 is performed and then step 301 is returned to, or if the determining result is no, step 303 is performed.

Step 303: it is determined whether a connection is broken, and if a determining result is yes, step 304 is performed, or if the determining result is no, step 301 is returned to.

Step 304: a connection is re-established.

Step 305: the browser is enabled and a connection is established.

In particular, in a process of controlling the browser by using the development tool debugging protocol and obtaining the webpage screenshot data, the browser needs to be monitored and the connection to the browser needs to be monitored. If the browser runs normally but it is monitored that the connection to the browser is broken abnormally, a communicable connection to the browser needs to be re-established before original operations of sending a control instruction and responding to receiving are continued. If it is monitored that the browser ends abnormally, the browser needs to be re-enabled, and the state of the browser and the connection status of the browser are monitored again.

In actual application, when the browser is controlled to render a webpage and obtain a webpage screenshot, the browser only needs to render webpage content and obtain webpage screenshot data, and does not need to display the webpage content on a screen. Therefore, the browser may be set to a no-graphical interface mode, and the browser does not create a display window, so that it can get rid of the dependence on a graphical interface, and the foregoing method for obtaining the webpage snapshot data is also applicable to a server end with no graphical interface environment. In addition, resource consumption can be reduced because no visible window is created.

Referring to the related descriptions in FIG. 1, in step 102, target webpage content is obtained from the obtained webpage snapshot data. In particular, the target webpage content to be synthesized with the input video is selected from the webpage snapshot data, and the target webpage content may be a webpage frame directly obtained after decoding, or may be a webpage frame obtained after a webpage obtained after decoding is processed. For example, image matting processing is performed on the webpage frame obtained after decoding, and partial content such as a special effect, texts, and images in the webpage frame is retained. Other webpage content in the obtained webpage snapshot data except the target webpage content is discarded, to prevent invalid content information from affecting a video presentation effect of a synchronized output video. When the target webpage content is obtained from the webpage snapshot data, the obtained webpage snapshot data may be decoded first, and then the target webpage content is selected from the webpage frame obtained after decoding.

Step 103: The selected target webpage content is synthesized with a pre-obtained input video. In particular, the pre-obtained input video may be a video obtained by a camera shooting, a screen capture, or a decoded source video, or obtained in another way. The obtained target webpage content is synthesized with the input video, to enrich picture content of the input video and improve expressiveness of the video. For example, the target webpage content may be a special effect, a text, a picture, or the like, the obtained special effect, text, or picture is synthesized into a specified location of the input video, and after the synthesis operation, a final output video picture includes both content of the input video and content of a webpage corresponding to a specified web address. Because a plurality of pieces of target webpage content may be synthesized with the input video, each piece of synthesized target webpage content may be different. In other words, a web address for obtaining the target webpage content may be changed in real time in a process of playing the input video. For example, a first piece of target webpage content needs to be synthesized at the second minute of the input video, the first piece of target webpage content is obtained from a webpage of Baidu, a second piece of target webpage content needs to be synthesized at the fourth minute of the input video, and the second piece of target webpage content is obtained a webpage of Youku. Therefore, a web address of Baidu is obtained at the second minute of the input video, to obtain webpage snapshot data of the Baidu webpage, the first piece of target webpage content is obtained based on the webpage snapshot data, and the obtained first piece of target webpage content is synthesized with a video frame at the second minute of the input video. At this time, an output video watched by users is the input video synthesized with the first piece of target webpage content. A web address of Youku is obtained at the fourth minute of the video, to obtain webpage snapshot data of the webpage of Youku, the second piece of target webpage content is obtained based on the webpage snapshot data, and the obtained second piece of target webpage content is combined with a video frame at the fourth minute of the input video. At this time, an output video watched by the users is the input video synthesized with the second piece of target webpage content. An effect that these special effects for the webpage are superimposed on the picture of the input video may be observed from a picture of the output video, so that a live picture is more vivid.

In actual application, the output video may be a live video, or may be a video on demand for the users. If the output video is a live video, the live video may be cached in a live broadcasting process by using a streaming media server, target webpage content is obtained when a synthesis operation needs to be performed, the target webpage content is synthesized with the cached live video, and a synthesized live video is finally output. If the output video is a video on demand, target webpage content is obtained when a server transcodes the video on demand, the target webpage content is synthesized with the video on demand, and a synthesized video on demand is finally output.

Compared to the existing technology, in the embodiments of the present disclosure, webpage snapshot data is obtained in real time based on a web address, target webpage content to be synthesized with a video is selected from the obtained webpage snapshot data, and the target webpage content is synthesized with an input video. Because the webpage content is characterized by a flexible element layout, abundant content, ease of configuration and modification, strong expressiveness, and the like, webpage texts, picture content, page elements, an animation effect, or the like are synthesized with a video picture, and are used as a special effect in the video picture and a scenario layout effect of the video picture, so that a generated video picture is more flexible and vivid, and it is also easy to configure and upgrade elements, a layout, an effect, and the like of the video picture.

Figure 4:
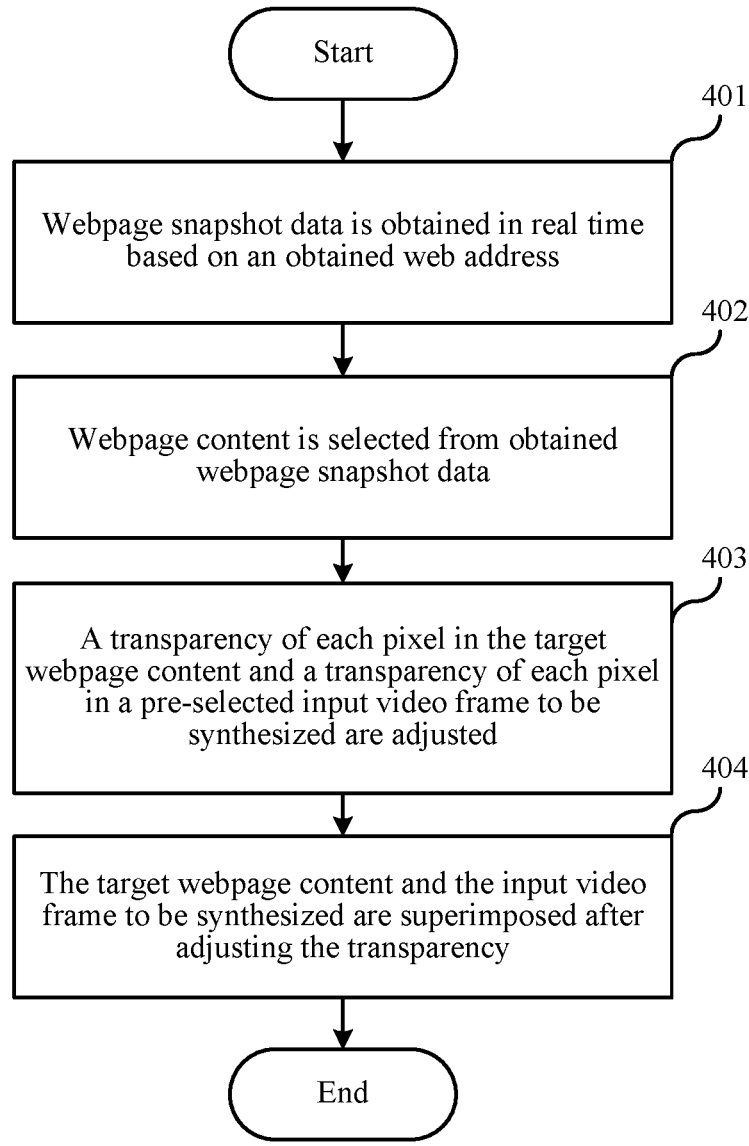
FIG. 4 is a flowchart of a video generating method according to a second embodiment of the present disclosure.

A second embodiment of the present disclosure relates to a video generating method. The second embodiment is further detailed based on the first embodiment. Details are as follows: In the second embodiment of the present disclosure, a method for synthesizing target webpage content and an input video is described in detail. A specific process is shown in FIG. 4.

Step 401: Webpage snapshot data is obtained in real time based on an obtained web address.

Step 402: Webpage content is selected from obtained webpage snapshot data.

Step 401 and step 402 are respectively consistent with step 101 and step 102 in the first embodiment, and details are not described herein again.

Step 403: A transparency of each pixel in the target webpage content and a transparency of each pixel in a pre-selected input video frame to be synthesized are adjusted.

Step 404: The target webpage content and the input video frame to be synthesized are superimposed after adjusting the transparency.

In particular, when the target webpage content is synthesized with the input video frame to be synthesized, the target webpage content may be used as a foreground picture, and the input video frame to be synthesized may be used as a background picture for synthesis. In other words, if picture content of the input video frame and picture content of a webpage content to be synthesized overlap in a specific region in an output picture, a picture of the webpage content to be synthesized may cover a picture of the input video frame, which may also be understood as that the picture of the input video frame is under the picture of the webpage content to be synthesized. Likewise, when the target webpage content is synthesized with the input video frame to be synthesized, the target webpage content may be used as a background picture, and the input video frame to be synthesized may be used as a foreground picture for synthesis. In other words, the picture of the input video frame is above the picture of the webpage content to be synthesized.

Synthesis method may be classified into full-picture synthesis and regional synthesis based on a size of the webpage content to be synthesized in the finally synthesized output picture. Full-picture synthesis means that an area occupied by the webpage content to be synthesized in a final output live picture is equal to an area of the output live picture. In other words, the webpage content to be synthesized totally covers the entire output live picture. Regional synthesis means that an area occupied by the webpage content to be synthesized in a final output live picture is less than an area of the output live picture. In other words, the webpage content to be synthesized occupies only a partial area of the output live picture.

In actual application, it is assumed that the resolution of the output picture is $W_o*H_o$. In other words, a width of the output live picture is $W_o$ pixels, and a height thereof is $H_o$ pixels. Generally, a resolution of the final output live picture is consistent with a resolution of the input video frame. It is assumed that a location of the webpage content to be synthesized in the output live picture is (p, q), and a size is $W_w*H_w$. In other words, a width of the webpage content to be synthesized in the output video picture is $W_w$ pixels, and a height is $H_w$ pixels, and a pixel at the upper left corner of the webpage content to be synthesized is located at a position of p pixels to the right and q pixels to the top at the upper left corner of the output video picture. It is assumed that a transparency of each pixel in the webpage content to be synthesized is normalized into an interval [0, 1], where transparency 0 represents complete transparency, and transparency 1 represents complete opacity. Steps of synthesizing the webpage content to be synthesized with the input video frame into the final output live picture are as follows.

First, the webpage content to be synthesized is zoomed. If the synthesis method is full-picture synthesis, when the resolution of the webpage content to be synthesized is inconsistent with the resolution of the output video picture, the webpage content to be synthesized is zoomed into a size that is the same as that of the output video picture, so that $W_w=W_o$, $H_w=H_o$. If the synthesis method is synthesis in a specified region, the webpage content to be synthesized is zoomed based on a configured region size to adapt to a specified region size.

Then, a transparency of each pixel in the webpage content to be synthesized and a transparency of each pixel in the input video frame are adjusted, and pixels of an adjusted webpage content and an adjusted input video frame are synthesized. When the synthesis manner is full-picture synthesis, it is assumed that a pixel in a finally synthesized output video picture is $Out_{i,j}$, where i and j are respectively location indexes of the pixel in a horizontal direction and a vertical direction, i represents an offset of the pixel from the pixel at the upper left corner of the output video picture in the horizontal direction, j represents an offset of the pixel from the pixel at the upper left corner of the output video picture in the vertical direction, $0 \le i < W_o$, and $0 \le j < H_o$. A pixel value of each pixel in the final output video picture is calculated based on the following formula:

$$Out_{i,j}=(1-\alpha_{i,j})*In_{i,j}+\alpha_{i,j}*Web_{i,j}.$$

where $\alpha_{i,j}$ is a transparency value of a pixel whose location in a zoomed webpage content to be synthesized is (i, j), $In_{i,j}$ is a pixel value of a pixel whose location in the input video frame is (i, j), and $Web_{i,j}$ is a pixel value of the pixel whose location in the zoomed webpage content to be synthesized is (i, j).

For example, when a transparency of each pixel in the webpage content to be synthesized includes only complete transparency and complete opacity, in other words, values of $\alpha_{i,j}$ include only 0 and 1, a pixel value of each pixel in the output video picture is $$Out_{i,j} = \begin{cases} In_{i,j}, & \text{when } \alpha_{i,j}=0 \\ Web_{i,j}, & \text{when } \alpha_{i,j}=1 \end{cases}.$$

It can be seen from the foregoing formula that, if a pixel in the zoomed webpage content to be synthesized is completely opaque, a pixel value of a pixel at a corresponding location in the output live picture is a pixel value of the pixel in the zoomed webpage content to be synthesized. If a pixel in the zoomed webpage content to be synthesized is completely transparent, a pixel value of a pixel at a corresponding location in the output video picture is a pixel value of a pixel at a corresponding location in the input video frame. If the pixel that is completely transparent in the webpage content to be synthesized is obtained by performing image matting on a background color in the webpage content to be synthesized, or is obtained by setting a background color of a webpage to a transparent color when the browser is used to render a webpage picture, non-background parts such as an animation and elements on the webpage in the final output video picture are retained, and are superimposed on the input video frame.

In addition, when the synthesis method is synthesis in a specified region, a value of a pixel in another region in the finally synthesized output video picture except a specified region occupied by the zoomed webpage content to be synthesized is equal to a value of a pixel at a corresponding location in the input video frame. In the specified region occupied by the zoomed webpage content to be synthesized, a synthesis method similar to full-picture synthesis is used. A pixel value of each pixel in the final output live picture is $$Out_{i,j} = \begin{cases} In_{i,j}, & \text{in other cases} \\ (1-\alpha_{i-p,j-q})*In_{i,j}+\alpha_{i-p,j-q}*Web_{i-p,j-q}, & \text{when } (i,j) \in S \end{cases}$$

A region S is the specified region occupied by the zoomed webpage content to be synthesized in the output video picture, that is, a region that satisfies the following restrictions:

$p \le i < p+W_w$ and $q \le j < q+H_w$.

It should be noted that, the foregoing examples are assumptions made to describe a synthesis principle in the embodiment of the present disclosure in detail, and in actual life, it is not limited to the foregoing synthesis methods, and different synthesis solutions may be used based on specific requirements. For example, the resolution of the final output video picture may optionally be unequal to the resolution of the input video frame, and in this case, the input video frame needs to be zoomed in a manner similar to that of the webpage content to be synthesized. For another example, the input video frame may optionally be used as a foreground picture, and the webpage content to be synthesized is used as a background picture. Alternatively, the input video frame does not completely cover the entire output video picture, and occupies only a region of the final output video picture. In this case, the input video frame needs to be synthesized into a specified region based on a regional location, and does not need to completely cover the entire output video picture.

Figure 5:
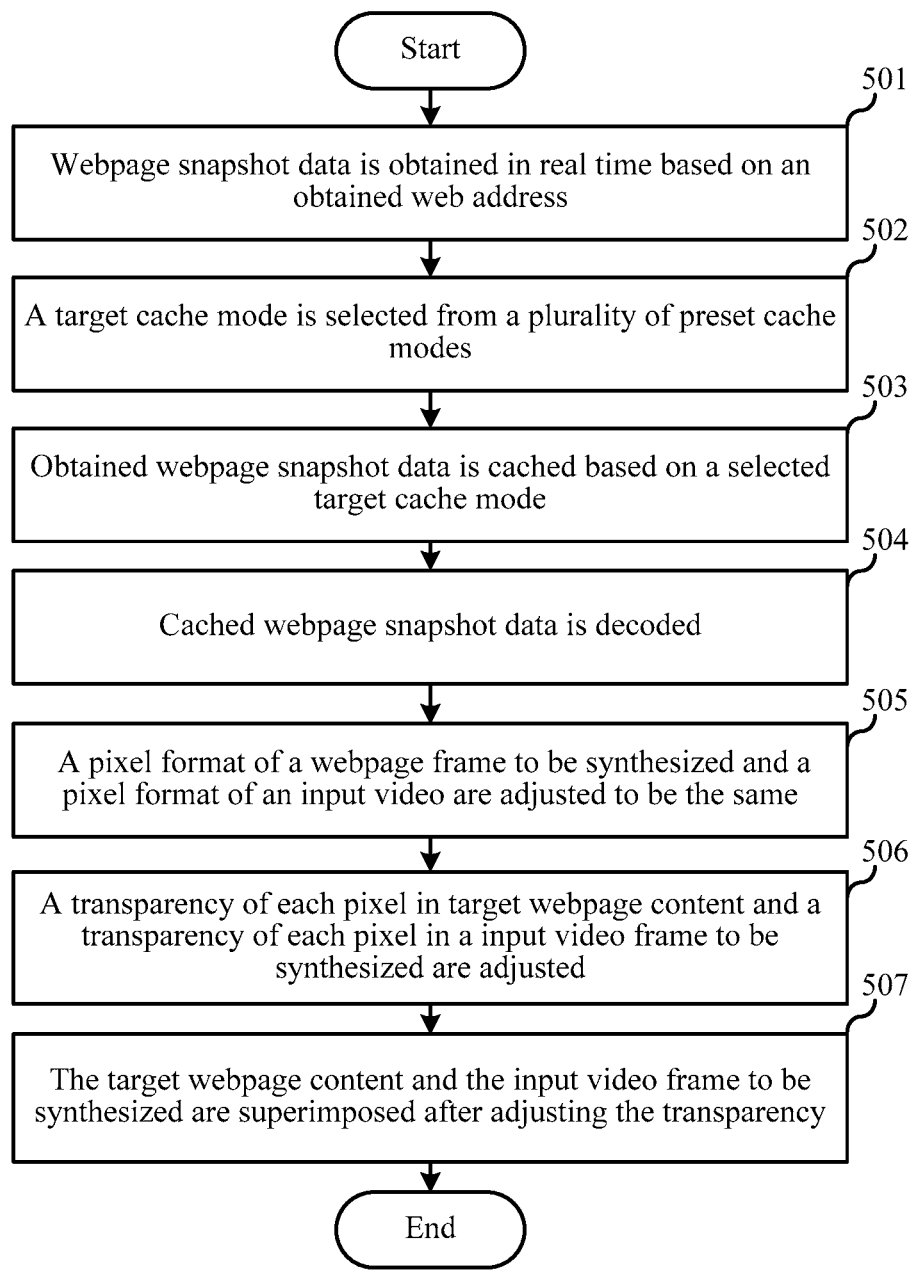
FIG. 5 is a flowchart of a video generating method according to a third embodiment of the present disclosure.

A third embodiment of the present disclosure relates to a video generating method. The third embodiment is further detailed based on the second embodiment. Details are as follows: In the third embodiment of the present disclosure, obtaining target webpage content from webpage snapshot data is described in detail. A specific process is shown in FIG. 5.

Step 501: webpage snapshot data is obtained in real time based on an obtained web address.

Step 502: a target cache mode is selected from a plurality of preset cache modes.

Step 503: obtained webpage snapshot data is cached based on a selected target cache mode.

Step 504: cached webpage snapshot data is decoded.

In particular, the pluralities of preset cache modes include at least a single cache mode and a periodic cache mode. Different cache modes used for caching correspond to different decoding methods. The different cache modes are described in detail below.

Figure 6:
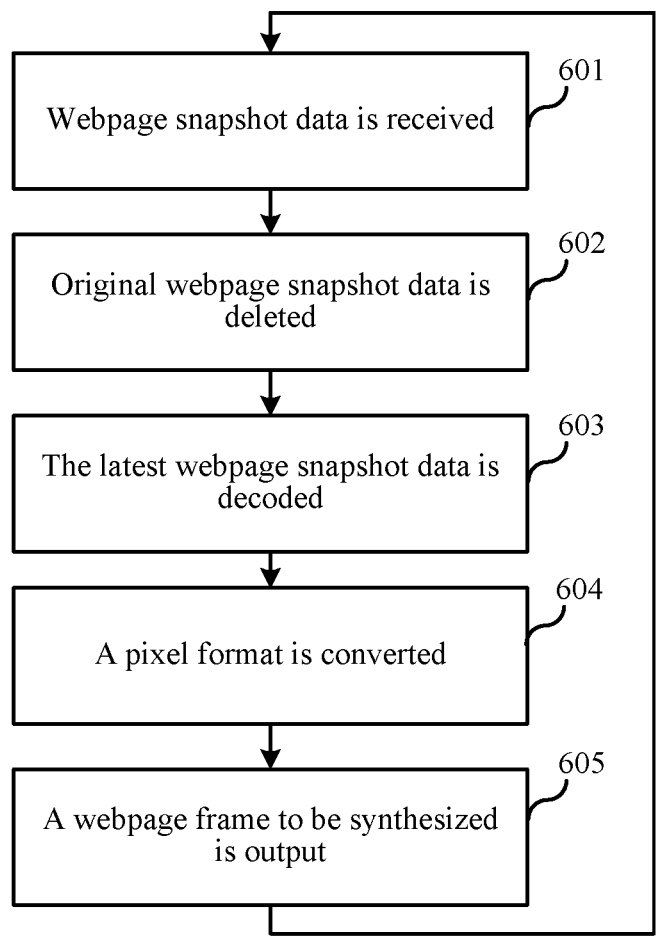
FIG. 6 is a flowchart of obtaining a webpage frame to be synthesized in a single cache mode according to a third embodiment of the present disclosure.

When the selected target cache mode is the single cache mode, only latest webpage snapshot data of a webpage is cached, and a webpage frame obtained after decoding the latest webpage snapshot data and performing necessary pixel format conversion is used as target webpage content. A specific process is shown in FIG. 6.

Step 601: webpage snapshot data is received.

Step 602: original webpage snapshot data is deleted.

Step 603: latest webpage snapshot data is decoded.

Step 604: a pixel format is converted.

Step 605: a webpage frame to be synthesized is output. That is, the target webpage content is output.

In particular, when the browser returns new webpage snapshot data and marks a timestamp, the original webpage snapshot data is erased, and after the new webpage snapshot data is decoded and necessary pixel format conversion is performed, the new webpage snapshot data is used as a new webpage frame to be synthesized to replace an original webpage frame to be synthesized, to ensure that a finally synthesized output video picture always includes webpage content at the latest moment. After the webpage frame to be synthesized is output, the webpage frame to be synthesized is combined with a video frame that is in the input video and that needs to be synthesized. Because there may be a plurality of video frames in the input video need to be synthesized, and each video frame needs to combined with one webpage frame to be synthesized, a plurality of webpage frames to be synthesized need to be obtained, and a plurality of output webpage frames to be synthesized are collectively referred to as the target webpage content.

In a single cache mode, cached webpage snapshot data includes only the latest webpage snapshot data of the webpage, and the target webpage content synthesized with an input video picture to be synthesized is always webpage contents obtained recently.

Figure 7:
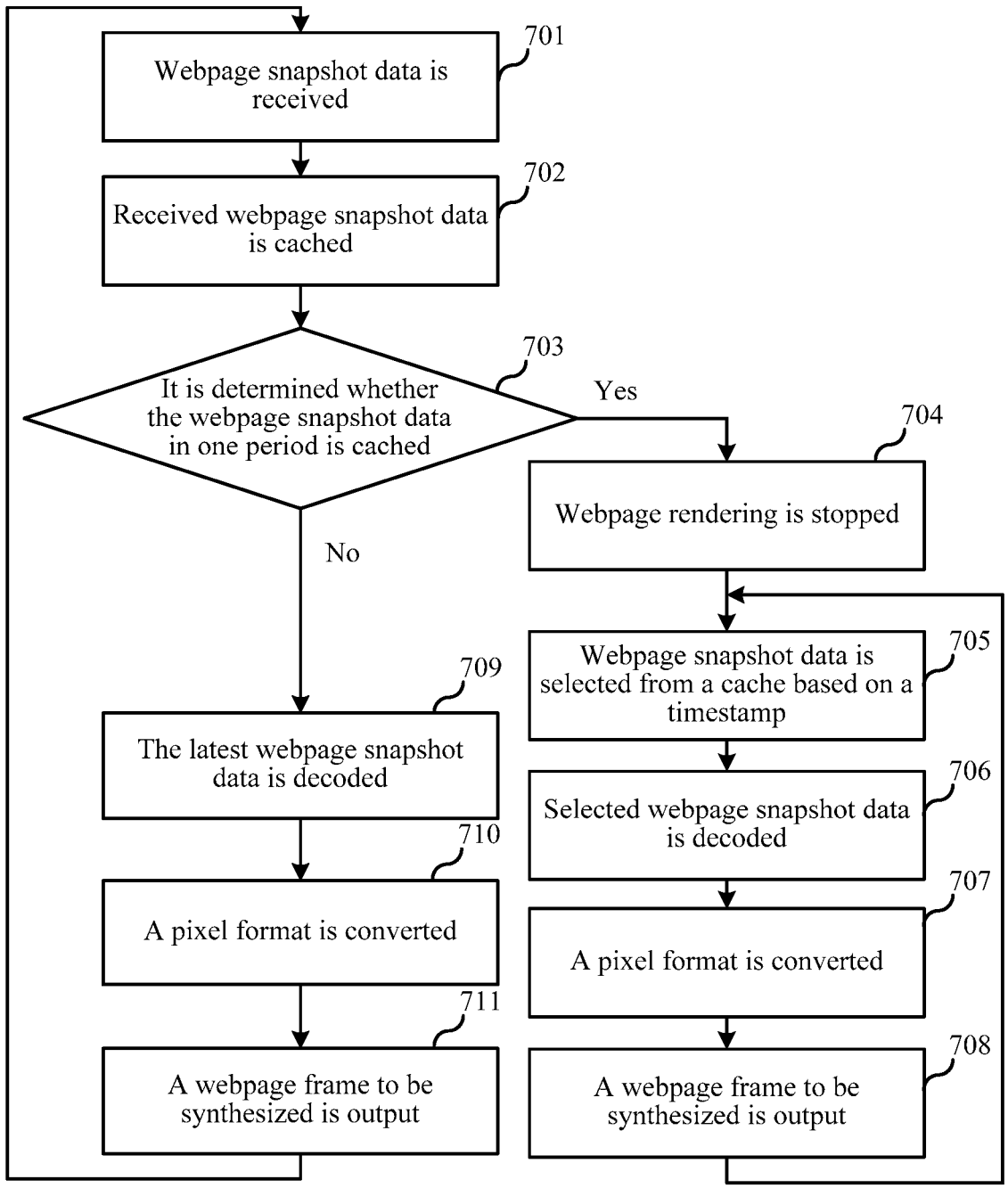
FIG. 7 is a flowchart of obtaining a webpage frame to be synthesized in a first periodic cache mode according to a third embodiment of the present disclosure.

When the selected target cache mode is the periodic cache mode, after webpage snapshot data within a specific timestamp range is cached, a process of rendering a webpage is stopped, and after webpage snapshot data in one period is cached, the target webpage content is obtained from cached webpage snapshot data in one period. In a specific embodiment, the target webpage content may be obtained from the cached webpage snapshot data in one period through the following two methods, and a process of obtaining the target webpage content in a first periodic cache mode is described in detail, as shown in FIG. 7.

Step 701: webpage snapshot data is received.

Step 702: received webpage snapshot data is cached.

Step 703: it is determined whether the webpage snapshot data in one period is cached, and if a determining result is yes, perform step 704, or if the determining result is no, perform step 709.

Step 704: webpage rendering is stopped.

Step 705: webpage snapshot data is selected from a cache based on a timestamp.

Step 706: selected webpage snapshot data is decoded.

Step 707: a pixel format is converted.

Step 708: a webpage frame to be synthesized is output, and step 705 is returned to after the webpage frame to be synthesized is output.

When it is determined that the webpage snapshot data in one period is not cached, step 709 is performed to decode latest webpage snapshot data.

Step 710: a pixel format is converted.

Step 711: a webpage frame to be synthesized is output.

In particular, when the cached data does not reach one period, latest cached webpage snapshot data is decoded and a pixel format is converted, to obtain the webpage frame to be synthesized. In this way, the webpage frame to be synthesized may optionally be output in a caching process, and it is not necessary to wait for the cached data to meet one period, so that time for waiting for caching is saved.

In particular, after webpage snapshot data in a specific timestamp range is cached, a process of rendering a webpage is stopped, required webpage snapshot data is selected from cached webpage snapshot data within a specific timestamp range, and a selected required webpage snapshot data is decoded and a pixel format is converted, to finally generate and output the webpage frame to be synthesized. The webpage snapshot data is selected based on an input video frame that needs to be synthesized, and a timestamp of the selected webpage snapshot data is determined based on a timestamp of the input video frame. A rule of selecting the webpage snapshot data is specifically as follows: it is assumed that the cached webpage snapshot data is $WTS_1$, $WTS_2, \ldots, WTS_n$ in ascending order of timestamps, and webpage snapshot data whose timestamps are $WTS_1$ and $WTS_n$ correspond to the same webpage picture content and represent a start and an end of a period. Therefore, it can be seen that a duration T of a webpage picture corresponding the cached webpage snapshot data is $T=WTS_n-WTS_1$. It is assumed that when the webpage frame to be synthesized starts to be synthesized with an output live picture, a timestamp of the input video frame is $ITS_1$. In this case, when the timestamp of the input video frame is $ITS_k$, the first webpage snapshot data whose timestamp is less than or equal to $mod(ITS_k-ITS_1,T)+WTS_1$ is found from the cached webpage snapshots in descending order of timestamps, and after the webpage snapshot is decoded and necessary pixel format conversion is performed, the webpage frame to be synthesized is updated and combined with the input video frame into a final output live picture. The mod represents a generalized remainder operation, that is, for two positive numbers x and y, mod(x, y) is a number that is greater than or equal to 0 and less than y, so that there is a non-negative integer p that satisfies $x=p*y+mod(x, y)$.

Figure 8:
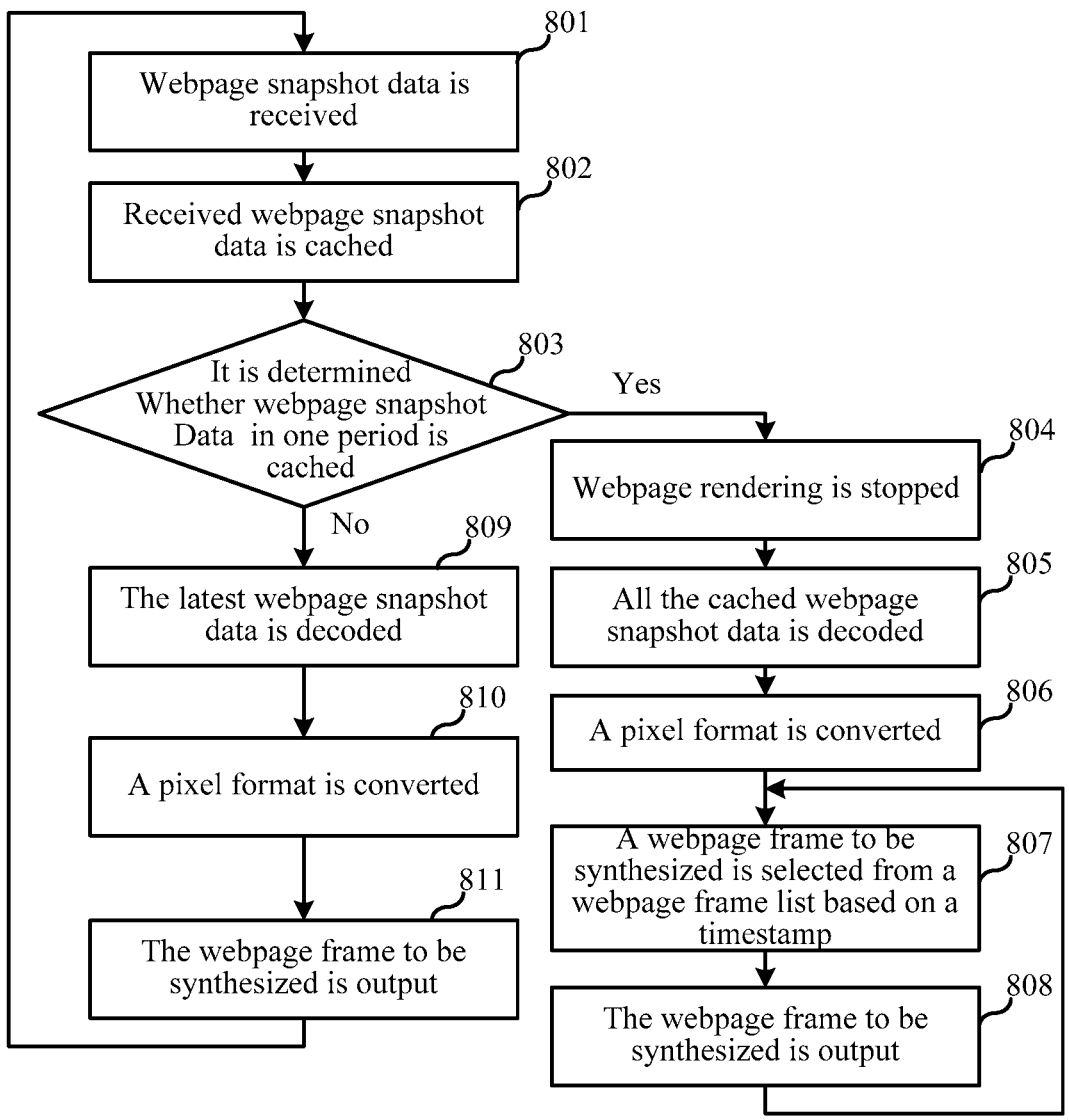
FIG. 8 is a flowchart of obtaining a webpage frame to be synthesized in a second periodic cache mode according to a third embodiment of the present disclosure.

A process of obtaining the target webpage content in a second periodic cache mode is described in detail below, as shown in FIG. 8.

Step 801: webpage snapshot data is received.

Step 802: received webpage snapshot data is cached.

Step 803: it is determined whether the webpage snapshot data in one period is cached, and if a determining result is yes, perform step 804, or if the determining result is no, perform step 809.

Step 804: webpage rendering is stopped.

Step 805: all the cached webpage snapshot data is decoded.

Step 806: a pixel format is converted.

Step 807: a webpage frame to be synthesized is selected from a webpage frame list based on a timestamp.

Step 808: the webpage frame to be synthesized is output, and step 807 is returned to after the webpage frame to be synthesized is output.

In particular, in the second periodic cache mode, all the cached webpage snapshot data is decoded at a time, and after necessary pixel format conversion is performed on all decoded bare video frames, a webpage frame list is formed. A timestamp of each webpage frame in the list is a corresponding timestamp for generating a webpage snapshot of the webpage frame, and webpage frames to be synthesized are selected from the webpage frame list one by one. Compared to the first periodic cache mode, in the second periodic cache mode, all the cached webpage snapshot data can be decoded at a time, and in a subsequent process, the webpage snapshot data does not need to be decoded again, and only the webpage frame to be synthesized needs to be selected from the webpage frame list based on a timestamp of an input video frame. It can be seen that, in such an embodiment of the periodic cache mode, computing resource consumption brought by decoding and format conversion can be reduced, but consumed memory resources are increased because a decoded webpage frame occupies additional memory space.

When it is determined that the webpage snapshot data in one period is not cached, step 809 is performed to decode the latest webpage snapshot data.

Step 810: a pixel format is converted.

Step 811: a webpage frame to be synthesized is output.

Step 809 to step 811 are respectively consistent with step 709 to step 711 in the first periodic cache mode, and details are not repeated herein again.

In conclusion, the periodic cache mode is usually applied to a case in which webpage content changes periodically. In this case, after a webpage snapshot data in one period is cached, webpage content rendering may be stopped, and in a subsequent process, required snapshot data is selected from the cached webpage snapshot data in one period, and is regarded as a webpage frame to be synthesized after being decoded and converted, or after all the webpage snapshot data is decoded and pixel formats are converted, the webpage frame to be synthesized is selected from the decoded webpage frame to synthesize an output live picture. Compared to a single cache mode, in the periodic cache mode, webpage rendering and webpage screenshot operations are stopped after the webpage snapshot data in one period is rendered, to reduce resource consumption, but the periodic cache mode is applicable to limited scenarios, and the single cache mode is applicable to a wider range. In actual operations, different cache modes may be selected based on different actual situations, to perform operations such as caching and decoding the webpage snapshot data.

Referring to the related descriptions of FIG. 5, in step 505, a pixel format of a webpage frame to be synthesized and a pixel format of an input video are adjusted to be the same. In particular, when the pixel format of the input video frame is inconsistent with a pixel format of a bare video frame obtained by decoding the webpage snapshot data, a pixel format of the bare video frame obtained by decoding the webpage snapshot data needs to be converted to the same as that of the input video frame, and then the target webpage content is obtained from the webpage snapshot data. In this way, the webpage content to be synthesized and the input video frame to be synthesized can be synthesized on a pixel level based on a specific synthesis mode. For example, a format of the input video frame is a common YUV 420P format, while the webpage snapshot data is a PNG image, and the bared video frame obtained by decoding the webpage snapshot data is an RGB 24 format. In this case, after a pixel format of a webpage frame in the RGB 24 format needs to be converted into the YUV 420P format, the webpage frame is used as the webpage frame to be synthesized, and the webpage frame to be synthesized is synthesized with the input video frame to form a final output live picture.

In addition, after the webpage frame to be synthesized is obtained, image matting may be performed on the webpage frame to be synthesized to obtain the target webpage content. In particular, if a background color of a webpage is not a transparent color, image matting processing needs to be performed on the webpage frame to be synthesized. One or more colors (which are usually background colors) may be preset in the image matting processing. If an approximation between a color of a pixel in the picture of the webpage frame to be synthesized and the specified color is within a specific range, the pixel is set to completely transparent. In this way, a picture part corresponding to meaningful page elements in the webpage frame to be synthesized may be kept, and is finally synthesized with the output video picture.

Step 506: a transparency of each pixel in target webpage content and a transparency of each pixel in a input video frame to be synthesized are adjusted.

Step 507: the target webpage content and the input video frame to be synthesized are superimposed after adjusting the transparency.

Step 506 and step 507 are respectively consistent with step 403 and step 404 in the second embodiment, and details are not described herein again.

After the output video is synthesized, other picture layout elements and effects in the output video picture except the collected input picture may be further extracted as a webpage template, and content of the webpage template is obtained by using the foregoing method and the content of the webpage template is synthesized with the live video picture. For example, the preset web address is specifically a template address, where the template address corresponds to a webpage template picture, and the webpage template picture is generated based on a layout manner and a picture effect of a historical output video. Webpage snapshot data obtained based on the template address is specifically screenshot data of the webpage template picture. In this way, a preset picture effect may be added to the input video, so that the picture effect and the layout manner can be dynamically configurable. Because the picture effect is preset, a location and other aspects of the obtained webpage picture to be synthesized do not need to be adjusted, so that efficiency of synthesizing the webpage picture with the input video can be improved.

Step division of the foregoing methods is merely for clear description, and during implementation, the steps may be combined into one step, or some steps may be split into a plurality of steps. They all fall within the protection scope of the present disclosure provided that they include the same logical relationship. Adding inessential modifications or introducing inessential designs into the algorithms or the processes without changing core designs of the algorithms and the processes falls within the protection scope of the present disclosure.

Figure 9:
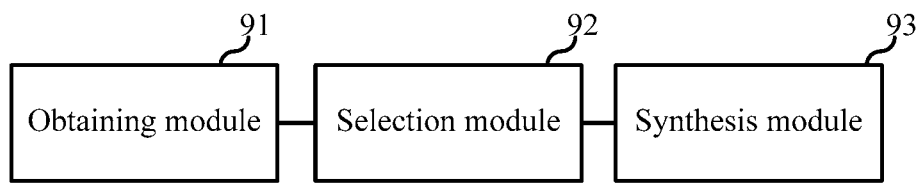
FIG. 9 is a schematic structural diagram of a video generating device according to a fourth embodiment of the present disclosure.

A fourth embodiment of the present disclosure relates to a video generating device, as shown in FIG. 9, including: an obtaining module 91, a selection module 92, and a synthesis module 93. The obtaining module 91 is configured to obtain webpage snapshot data based on an obtained web address, the selection module 92 is configured to select target webpage content from obtained webpage snapshot data, and the synthesis module 93 is configured to synthesize a selected target webpage content with a pre-obtained input video, to generate an output video including the target webpage content.

The obtaining module 91 is specifically configured to manage a webpage that needs to be used during synthesis of a live picture, including three functions: pre-setting a configuration application, receiving and responding to a control instruction, and a page addition/deletion operation. The obtaining module maintains a valid webpage list. The valid webpage list is a list of webpages that need to be synthesized with a live video, in other words, picture content of a plurality of webpages may be synthesized with the outputted live video at a same moment.

Figure 10:
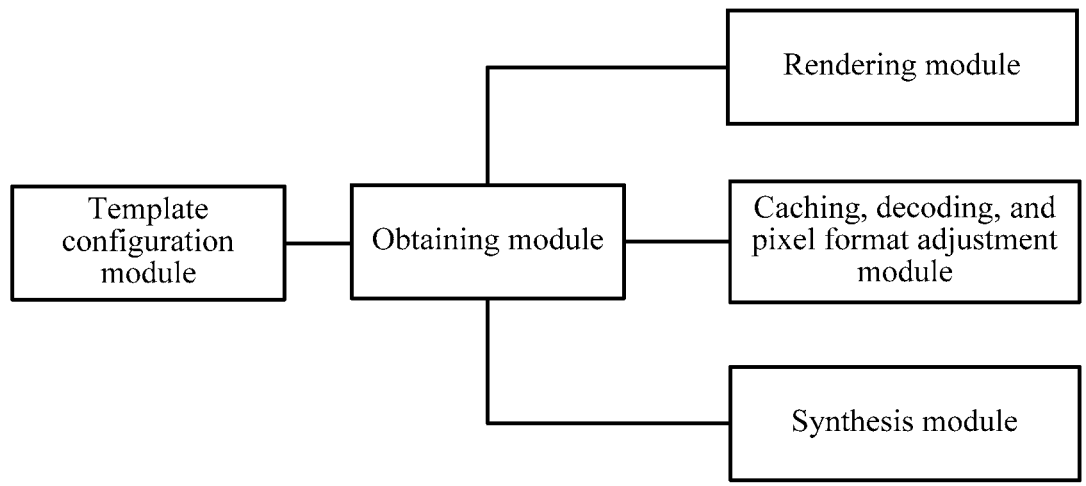
FIG. 10 is a flowchart of a running process of the video generating device according to a fourth embodiment of the present disclosure.

In actual application, when a system starts to run, the obtaining module 91 is responsible for adding a preset webpage into the valid webpage list based on default setting, a configuration file, or the like. In this way, the preset webpage can be synthesized with the live picture before a definite page addition/deletion operation is received. The preset webpage may be a start animation, a live broadcast trailer animation, or the like at the beginning of live broadcasting. In a system running process, as shown in FIG. 10, the obtaining module 91 receives, in real time, a control instruction sent by the outside of the system, and responds to the control instruction. The control instruction includes a page addition/deletion instruction, a webpage content synthesis suspend/start instruction, an instruction for reporting information about a current synthesis situation, or the like. A page addition/deletion operation is performed when the page addition/deletion instruction is received. When receiving the webpage content synthesis suspend/start instruction, the obtaining module 91 sends a webpage content synthesis suspend/start message to the synthesis module 93, so that one or several pieces of corresponding webpage picture content are cancelled/restored from the output live picture. When the instruction for reporting information about the current synthesis situation is received, content of the current valid webpage list, a synthesis/synthesis-suspended state of each current webpage, or the like is reported. When a page addition instruction is received, a new web address is added to the valid webpage list, and a new rendering module and a new caching, decoding, and conversion module are enabled for a newly added webpage, to render, cache, decode, and convert a newly added webpage snapshot. When a page deletion instruction is received, a corresponding webpage is deleted from the valid webpage list, and a rendering module and a caching, decoding, and conversion module that are corresponding to the webpage are deleted. In addition, in the system running process, if the rendering module fails to render a page, the rendering module reports the webpage that fails to be rendered and a failure reason to the obtaining module 91. In this case, the obtaining module 91 deletes the webpage that fails to be rendered from the valid webpage list, and then deletes a rendering module and a caching, decoding, and conversion module instance that are corresponding to the webpage, and reports a current webpage rendering failure event and a corresponding error message to the outside of the system.

On one hand, the synthesis module 93 synthesizes, based on a specified picture synthesis parameter, an input video frame outside the system and one or more webpage frames to be synthesized, to generate a final output video picture frame. The input video frame is outside the system, and the one or more webpage frames to be synthesized are from the caching, decoding, and conversion module. The picture synthesis parameter includes a resolution of a video picture, a size and a location of the input video frame in a output live picture, a size and a location of each webpage frame to be synthesized in an output video picture, a blocking relationship between the webpage frames to be synthesized, a blocking relationship between the webpage frames to be synthesized and the input video frame, and a parameter indicating whether a related operation such as an image matting operation is performed on each webpage frame to be synthesized and the input video frame. The synthesis module 93 zooms, based on the size of each webpage frame to be synthesized in the output video picture, each webpage frame to be synthesized in to a size specified for adaptation, and if there is image matting setting for the webpage frame to be synthesized, performs image matting on the webpage frame to be synthesized based on a specified image matting parameter. Similarly, zoom-in and a necessary image matting operation are also performed on the input video frame based on a corresponding synthesis parameter. Then, each webpage frame to be synthesized and the input video frame are put on specified locations in the output picture based on the location of each webpage frame to be synthesized in the output picture and the location of the input video frame in the output picture. When the webpage frames to be synthesized overlap, or the webpage frame to be synthesized overlaps the input video frame in some regions, the webpage frames to be synthesized and the input video frame are superimposed based on the blocking relationship between each webpage to be synthesized and the input video frame in the output picture and respective transparency information, to generate a pixel value of each pixel in the final output live picture.

On the other hand, the synthesis module 93 enables and disables, based on the webpage content synthesis suspend/start instruction sent by the obtaining module 91, a process of using a specified webpage frame to be synthesized in a process of synthesizing the output video picture. While synthesizing the output picture, the synthesis module 93 further receives the webpage content synthesis suspend/start instruction of the obtaining module 91 in real time. The synthesis module 93 maintains a synthesis status of a webpage frame to be synthesized of each current webpage internally, where the synthesis status includes an enabled state and a disabled state. After receiving an instruction of stopping synthesizing a specific webpage, the synthesis module 93 sets a state of a webpage frame to be synthesized corresponding to the webpage to a disabled state. After an instruction of starting to synthesize a specific webpage is received, a state of a webpage frame to be synthesized corresponding to the webpage is set to an enabled state. In the process of synthesizing the output picture, the synthesis module 93 uses only the input video frame and all webpage frames to be synthesized in an enabled state, and does not use webpage frames to be synthesized in a disabled state.

Compared to the existing technology, in the embodiments of the present disclosure, because webpage content is characterized by a flexible element layout, abundant content, ease of configuration and modification, strong expressiveness, and the like, webpage texts, picture content, page elements, an animation effect, or the like are synthesized with a video picture, and are used as a special effect in the video picture, a scenario layout effect of the video picture, or the like, so that the generated video picture is more flexible and vivid, and it is also easy to configure and upgrade elements, a layout, an effect, and the like of the video picture.

It is not difficult to find that the embodiment is a system embodiment corresponding to the first embodiment, and the embodiment may be implemented in cooperation with the first embodiment. Related technical details mentioned in the first embodiment are still valid in the embodiment. Details are not described herein again to reduce repetition. Correspondingly, related technical details mentioned in the embodiment may also be applied to the first embodiment.

It should be noted that, the modules in the embodiment are logical modules. In actual application, one logical module may be a physical unit, or may be a part of a physical unit, or may be implemented by combining a plurality of physical units. In addition, in order to highlight an innovation part of the present disclosure, in the embodiment, a unit that is not so close to resolving of the technical problems provided in the present disclosure is not introduced, but it does not mean that there are no other units in the embodiment.

In addition, the synthesis module 93 specifically includes a selection module, an adjustment module, and a superimposition module. The selection module is configured to select a input video frame to be synthesized from an input video. The adjustment module is configured to adjust a transparency of each pixel in a target webpage content and a transparency of each pixel in the input video frame to be synthesized. The superimposition module is configured to superimpose a target webpage content and an input video frame to be synthesized after adjusting the transparency.

In addition, a decoding module is further included. The decoding module is configured to decode obtained webpage snapshot data to obtain the webpage frame to be synthesized. The selection module is configured to select the target webpage content from the webpage frame to be synthesized.

In addition, the selection module is specifically configured to determine a timestamp of the webpage frame to be synthesized based on a timestamp of the input video frame to be synthesized, and select webpage snapshot data to be synthesized from the obtained webpage snapshot data based on a determined timestamp of the webpage frame to be synthesized.

In addition, a caching module is further included. The caching module is configured to select a target cache mode from a plurality of preset cache modes, and cache obtained webpage snapshot data based on a selected target cache mode. The decoding module is specifically configured to obtain a pre-stored correspondence between the target cache mode and a decoding rule, and decode cached webpage snapshot data based on the decoding rule corresponding to the target cache mode.

In addition, a pixel format adjustment module is further included. The pixel format adjustment module is configured to adjust a pixel format of the webpage frame to be synthesized and a pixel format of the input video to be the same.

In addition, a resolution adjustment module is further included. The resolution adjustment module is configured to adjust a resolution of the target webpage content and a resolution of the input video to be the same.

In addition, a rendering module and a capturing module are further included. The rendering module is configured to: render a webpage picture based on a preset web address, and when an amount of the obtained webpage snapshot data reaches a preset threshold, stop rendering the webpage picture. The capturing module is configured to: capture the rendered webpage picture in real time, and when the amount of the obtained webpage snapshot data reaches the preset threshold, stop capturing the rendered webpage picture.

In particular, the rendering module renders webpage content by using a browser that supports a development tool debugging protocol, and obtains webpage screenshot data. In a process of rendering a webpage by using the browser, the rendering module tracks a page process and a network process of the webpage through the development tool debugging protocol. If it is found in a process of tracking the webpage network that a specified web address cannot be accessed, or if it is found in a process of tracking the webpage that response code of a specified webpage is wrong, a web address of the specified webpage is marked as invalid, a rendering process of the webpage is stopped, and a web address of a failed page and an error message are transferred to the obtaining module 91. If the specified webpage is accessed successfully and loaded successfully, the rendering module sends a screenshot instruction to the browser through the development tool debugging protocol, obtains a screenshot of current webpage content as snapshot data of the current webpage, and sends the data to the caching, decoding, and conversion module after marking a timestamp.

In addition, a detection module is further included. The detecting module is configured to detect a webpage loading state. The capturing module is configured to capture a picture of loaded webpage in real time after it is detected that the picture of the webpage is loaded.

In addition, a setting module is further included. The setting module is configured to preset a page attribute.

In addition, a template configuration module is further included. The template configuration module is configured to produce a webpage template based on a generated output video. The webpage template includes at least information representing a picture effect of the output video, or information representing a layout manner of the output video. The webpage template is invoked based on a template address corresponding to the webpage template when the webpage snapshot data is obtained.

The template configuration module is configured to generate a series of preset template webpages with common page setting and layout effects, and the template webpage includes fixed webpage elements and layout setting, and content of the elements are configurable. The content of the page elements is configured in two manners: i.e., pre-setting element content, and setting an address for obtaining the element content in real time. The template webpage provided by the template configuration module is used, and after an element of each piece of configurable content in the template webpage is set in a preset manner, an address of the template webpage is added to the valid webpage list of the obtaining module 91, so that a preset layout manner, page elements, picture effects, and the like may be synthesized with the output video picture, to achieve a video play effect in some fixed scenarios.

An application program is used as an example. In live broadcasting scenarios such as a variety show, a sports event, and a news studio, a fixed picture layout style is always used. For example, remaining time of a match is displayed at the right corner of the sports event, and current latest scores are displayed in the lower middle part. Rolling news is displayed in the lower part of the news studio. Because these layouts are always fixed in a plurality of times of live broadcasting, other picture layout elements (for example, the animation effect, the scores, the time, and the rolling news) and effects in the picture except a collected input picture are extracted, to construct and generate a template webpage, and the template webpage has a required picture layout element and effect, and a background color of the template webpage is a transparent color. Content of these elements may be preset, for example, rolling news to be broadcast may be preset. Alternatively, a server address for obtaining content of the elements in real time may be set, and a script in the template webpage obtains the content from the specified server address in real time, for example, real-time update of match scores and remaining time. In a live broadcasting process, only a corresponding template webpage needs to be selected, and after an element of each piece of configurable content in the template webpage is set in a preset manner, a control instruction is delivered to the obtaining module 91, and specified page content of the template webpage is added to the output video picture, so that a picture layout effect of the variety show, the sports event, or the studio can be achieved. Because the webpage itself may include a dynamic script, and a remote server is connected by using the script to obtain update information, effects such as real-time update of scores of the sports event, real-time news rolling in the studio, and the like can be achieved. When a layout or content of a corresponding element needs to be adjusted or modified, only the template webpage in the template configuration module in the present disclosure needs to be modified, and any stage in an entire process from video collection to play does not need to be modified. Therefore, it has the characteristics of easy to configure and update a live picture effect.

Figure 11:
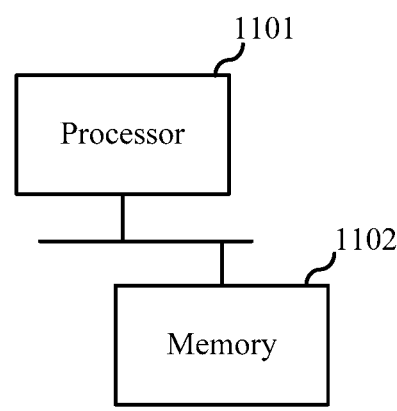
FIG. 11 is a schematic structural diagram of a server according to a fifth embodiment of the present disclosure.

A fifth embodiment of the present disclosure relates to a server, as shown in FIG. 11, including at least one processor 1101 and a memory 1102 in communication with the at least one processor 1101, where the memory 1102 stores instructions executable by the at least one processor 1101, and the instructions are executed by the at least one processor 1101 to enable the at least one processor 1101 to perform the video generating method described above.

The memory 1102 and the processor 1101 are connected by a bus, the bus may include any number of interconnected buses and bridges, and the bus connects one or more processors 1101 to various circuits of the memory 1102. The bus may further connect various other circuits such as a peripheral device, a voltage regulator, and a power management circuit together. These are all known in the field, and therefore are not further described herein. A bus interface provides an interface between the bus and the transceiver. The transceiver may be one component or a plurality of components, for example, a plurality of receivers and transmitters, and provides units for communicating with various other apparatuses on a transmission medium. Data processed by the processor is transmitted on a wireless medium by using an antenna. Further, the antenna further receives data and transfers the data to the processor 1101.

The processor 1101 is responsible for managing the bus and the usual processing, including timing, peripheral interfacing, voltage adjustment, power management, and other control function. The memory 1102 may be used to store data used by the processor 1101 in performing operations.

A sixth embodiment of the present disclosure relates to a compute readable storage medium storing a computer program. When the computer program is executed by the processor, the foregoing method embodiments are implemented.

In other words, those skilled in the art may understand that all or some of the steps for implementing the methods in the foregoing embodiments may be completed through a program that instructs related hardware. The program is stored in a storage medium, including several instructions for enabling one device (which may be a single-chip microcomputer, a chip, or the like) or a processor to perform all or some of the steps of the methods described in the embodiment of the present disclosure. The foregoing storage medium includes: any medium that can store program code, such as a USB flash memory drive, a removable hard disk, a read-only memory (ROM), a random access memory (RAM), a magnetic disk, or an optical disc.

Those skilled in the art can understand that the above embodiments are specific embodiments for implementing the present disclosure, and in the actual application, various changes may be made in form and detail without departing from the scope of the present disclosure.

What is claimed is:

1. A video generating method applied to a server, comprising:
    obtaining a web address;
    obtaining webpage snapshot data in real time based on the web address;
    selecting target webpage content from obtained webpage snapshot data; and
    synthesizing a selected target webpage content with a pre-obtained input video, to generate an output video comprising the target webpage content;
    the method further comprising, after obtaining webpage snapshot data and before selecting target webpage content:
    selecting a target cache mode from a plurality of preset cache modes; and
    caching the obtained webpage snapshot data based on a selected target cache mode;
    wherein selecting target webpage content from obtained webpage snapshot data includes selecting the target webpage content from cached webpage snapshot data.

2. The video generating method according to claim 1, wherein synthesizing a selected target webpage content with a pre-obtained input video specifically comprises:
    adjusting a transparency of each pixel in the target webpage content and a transparency of each pixel in a pre-selected input video frame to be synthesized, wherein the input video frame to be synthesized is selected from an input video; and
    superimposing the target webpage content and the input video frame to be synthesized after adjusting the transparency.

3. The video generating method according to claim 2, wherein a superimposing manner is specifically: full-picture superimposing or superimposing in a specified region.

4. The video generating method according to claim 1, wherein selecting the target webpage content from cached webpage snapshot data specifically comprises:
    decoding the cached webpage snapshot data to obtain a webpage frame; and
    selecting the target webpage content from the webpage frame.

5. The video generating method according to claim 1, wherein selecting the target webpage content from cached webpage snapshot data specifically comprises:
    determining a timestamp of the target webpage content based on a timestamp of the input video frame to be synthesized, wherein the input video frame to be synthesized is selected from the input video;
    selecting webpage data to be synthesized from the cached webpage snapshot data based on a determined timestamp of the target webpage content; and
    decoding selected webpage data to be synthesized to obtain the target webpage content.

6. The video generating method according to claim 1, wherein after selecting target webpage content and before synthesizing a selected target webpage content with a pre-obtained input video, the method further comprises:
    adjusting a pixel format of the target webpage content and a pixel format of the input video to be the same.

7. The video generating method according to claim 1, wherein after selecting target webpage content and before synthesizing a selected target webpage content with a pre-obtained input video, the method further comprises:
    adjusting a resolution of the target webpage content and a resolution of the input video to be the same.

8. The video generating method according to claim 1, wherein obtaining webpage snapshot data in real time based on the web address specifically comprises:
    rendering a webpage picture based on the web address, and capturing a rendered webpage picture in real time;
    obtaining a captured webpage picture as webpage snapshot data; and
    stopping rendering the webpage picture and stopping capturing the rendered webpage picture when an amount of obtained webpage snapshot data reaches a preset threshold.

9. The video generating method according to claim 8, wherein capturing a rendered webpage picture in real time specifically comprises:
    capturing a loaded webpage picture in real time after the webpage picture is loaded.

10. The video generating method according to claim 1, wherein obtaining webpage snapshot data in real time is specifically: webpage snapshot data that satisfies a preset page attribute; wherein a page attribute comprises at least any one of or any combination of the following: a background color, a resolution, or an interaction mode.

11. The video generating method according to claim 1, wherein the web address is specifically a template address; wherein the template address corresponds to a webpage template picture, the webpage template picture is generated based on a layout manner and a picture effect of a historical output video; and the webpage snapshot data is specifically: screenshot data of the webpage template picture.

12. A server, comprising:
at least one processor; and
a memory in communication with the at least one processor;
wherein the memory stores instructions executable by the at least one processor, and the instructions are executed by the at least one processor to enable the at least one processor to perform a video generating method;
wherein the video generating method comprises:
obtaining a web address;
obtaining webpage snapshot data in real time based on the web address;
selecting target webpage content from obtained webpage snapshot data; and
synthesizing a selected target webpage content with a pre-obtained input video, to generate an output video comprising the target webpage content;
the method further comprising, after obtaining webpage snapshot data and before selecting target webpage content:
selecting a target cache mode from a plurality of preset cache modes; and
caching the obtained webpage snapshot data based on a selected target cache mode;
wherein selecting target webpage content from obtained webpage snapshot data includes selecting the target webpage content from cached webpage snapshot data.

13. The server according to claim 12, wherein synthesizing a selected target webpage content with a pre-obtained input video specifically comprises:
adjusting a transparency of each pixel in the target webpage content and a transparency of each pixel in a pre-selected input video frame to be synthesized, wherein the input video frame to be synthesized is selected from an input video; and
superimposing the target webpage content and the input video frame to be synthesized after adjusting the transparency.

14. The server according to claim 12, wherein obtaining webpage snapshot data in real time based on the web address specifically comprises:
rendering a webpage picture based on the web address, and capturing a rendered webpage picture in real time;
obtaining a captured webpage picture as webpage snapshot data; and
stopping rendering the webpage picture and stopping capturing the rendered webpage picture when an amount of obtained webpage snapshot data reaches a preset threshold.

15. A non-transitory computer readable storage medium storing a computer program, wherein when the computer program is executed by a processor, a video generating method is implemented;
wherein the video generating method comprises:
obtaining a web address;
obtaining webpage snapshot data in real time based on the web address;
selecting target webpage content from obtained webpage snapshot data; and
synthesizing a selected target webpage content with a pre-obtained input video, to generate an output video comprising the target webpage content;
the method further comprising, after obtaining webpage snapshot data and before selecting target webpage content:
selecting a target cache mode from a plurality of preset cache modes; and
caching the obtained webpage snapshot data based on a selected target cache mode;
wherein selecting target webpage content from obtained webpage snapshot data includes selecting the target webpage content from cached webpage snapshot data.

16. The non-transitory computer readable storage medium according to 15, wherein synthesizing a selected target webpage content with a pre-obtained input video specifically comprises:
adjusting a transparency of each pixel in the target webpage content and a transparency of each pixel in a pre-selected input video frame to be synthesized, wherein the input video frame to be synthesized is selected from an input video; and
superimposing the target webpage content and the input video frame to be synthesized after adjusting the transparency.

17. The non-transitory computer readable storage medium according to 15, wherein obtaining webpage snapshot data in real time based on the web address specifically comprises:
rendering a webpage picture based on the web address, and capturing a rendered webpage picture in real time;
obtaining a captured webpage picture as webpage snapshot data; and
stopping rendering the webpage picture and stopping capturing the rendered webpage picture when an amount of obtained webpage snapshot data reaches a preset threshold.

* * * * *